United States Patent
Bloebaum et al.

(10) Patent No.: US 7,006,790 B2
(45) Date of Patent: Feb. 28, 2006

(54) METHOD AND SYSTEM FOR GPS BIT-EDGE SYNCHRONIZATION IN THE PRESENCE OF BURST-MODE INTERFERENCE

(75) Inventors: L. Scott Bloebaum, Cary, NC (US); Douglas A. Cairns, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 618 days.

(21) Appl. No.: 09/870,072

(22) Filed: May 30, 2001

(65) Prior Publication Data

US 2002/0183070 A1 Dec. 5, 2002

(51) Int. Cl.
*H04B 7/185* (2006.01)
(52) U.S. Cl. .............. 455/13.2; 455/456.1; 342/357.12
(58) Field of Classification Search .............. 455/12.1, 455/13.1, 2, 456.1–6; 342/356, 357.1–4, 342/357.6–17, 358, 357.12, 357.15, 382
See application file for complete search history.

(56) References Cited

U.S. PATENT DOCUMENTS 6,188,354 B1 * 2/2001 Soliman et al. ...... 342/357.1 X
6,230,018 B1 * 5/2001 Watters et al. .......... 455/456.3
6,704,547 B1 * 3/2004 Kuwahara et al. ... 455/456.1 X

* cited by examiner

Primary Examiner—Edan Orgad
Assistant Examiner—Philip J. Sobutka
(74) Attorney, Agent, or Firm—Coats & Bennett, P.L.L.C.

(57) ABSTRACT

In a satellite navigation system receiver co-located with a wireless communication system mobile terminal, periodic interference from the mobile terminal preventing bit-edge synchronization with one or more satellite signals is overcome by using Time Difference Of Arrival (TDOA) values associated with the satellite signals. Either a satellite signal free of periodic interference is chosen by inspection of the TDOA values, or the TDOA values are ranked and synchronization is attempted iteratively. Once a satellite signal is synchronized, the TDOA values are used to calculate synchronization for the remaining signals. The TDOA values may be transmitted to the mobile terminal by a satellite navigation signal information server connected to the wireless communication system, either individually or in broadcast mode to one or more cells. Alternatively, the mobile terminal may acquire the TDOA values from memory or from another data interface.

29 Claims, 6 Drawing Sheets

METHOD AND SYSTEM FOR GPS BIT-EDGE SYNCHRONIZATION IN THE PRESENCE OF BURST-MODE INTERFERENCE

BACKGROUND OF THE INVENTION

The present invention relates generally to the field of GPS receivers and specifically to a GPS receiver integrated with a wireless communications mobile terminal.

Wireless mobile terminals, utilized in mobile communications systems, are increasingly being integrated with a broad array of consumer electronics devices to expand their functionality and offer a greater range of services to the user. One such consumer electronics device is a geographic position estimator, and in particular, one that derives position estimates from the reception and decoding of signals broadcast by navigation satellites. The predominant example of such a satellite navigation system in the U.S. is the Global Positioning System (GPS).

The provision of a geographic position estimator in a wireless communications mobile terminal provides several benefits and enables the delivery of advanced services to the user. For example, the geographic position of a mobile terminal may be supplied to emergency services operators whenever the user places an emergency call using the mobile terminal. This ability is required by current and proposed FCC regulations. A user may optionally desire to transmit position information to the called party in other situations, for example, to obtain directions, or to update his position as part of a job requirement. A position estimator also enables the delivery of a variety of position-based information services, such as maps showing a user's location and directions to a destination, a listing of hotels, restaurants, or other businesses offering particular services within the user's immediate area, and the like. Additionally, knowledge of the mobile terminal's geographic location enables position-targeted advertising, such as for example, transmitting to the mobile terminal an electronic coupon redeemable at a business establishment as the user passes within walking distance of the business.

The GPS navigation system operates by simultaneously calculating a receiver's range to several GPS satellites and calculating the receiver's position based on those ranges (a process known generally as trilateration). To determine a receiver's position on the surface of the earth (i.e., in three dimensions), the range to at least three separate satellites must be determined. Each range is calculated from the propagation time of a signal transmitted from the satellite to the receiver, and the signal's known speed (which is, for GPS radio signals, the speed of light in a vacuum, and somewhat less through the ionosphere and atmosphere). The greatest source of error in the range calculation is inaccurate measurement of the signal propagation time, due to the inherent difficulty of accurately synchronizing time measurement between the precision atomic clocks located on the GPS satellites and the local clock at the receiver. This time synchronization problem is resolved by calculating the range to a fourth GPS satellite. Thus, a receiver's position estimate is derived by resolving four unknown quantities (three locational coordinates and time) using the range and position information from four satellites.

GPS satellites orbit at approximately 11,000 miles altitude, and consequently the strength of their broadcast signals received at the earth's surface is extremely low. Various signal reception, amplification, filtering and multi-path resolution techniques to accurately and reliably receive and interpret GPS signals are known in the art and commonly employed in stand-alone GPS receivers. A significant issue facing the integration of a GPS receiver into a wireless communications system mobile terminal, however, is that radio interference caused by the mobile terminal's transmission of radio signals as part of its communication with the mobile wireless communications system hampers the reception of GPS signals.

SUMMARY OF THE INVENTION

In one embodiment, the present invention relates to mobile wireless communications system containing a radio access network and at least one mobile terminal containing a position estimator and periodically transmitting radio frequency signals. The communications system also includes a satellite navigation signal information server operative to transmit information about the relative timing between satellite navigation signals to the mobile terminal through the radio access network. The mobile terminal utilizes the relative timing information to overcome interference from the periodic transmission of radio frequency signals in order to perform bit-edge synchronization with the satellite signals.

In another embodiment, the present invention relates to a method of performing bit-edge synchronization for a plurality of navigation satellite signals in the presence of periodic interference. Predetermined Time Difference Of Arrival (TDOA) values for the navigation satellite signals are obtained, and bit-edge synchronization is performed on one satellite signal. The bit-edge synchronizations for at least one remaining satellite signal are then calculated based on predetermined TDOA values.

DETAILED DESCRIPTION OF THE INVENTION

The present invention provides a method of performing bit-edge synchronization on a plurality of satellite navigation signals in the presence of interference due to radio frequency transmissions from the mobile terminal to an associated wireless communications system. The interference caused by the mobile terminal is overcome by utilizing satellite navigation signal data that may be supplied to the mobile terminal by the mobile communications system. The present invention is described herein with reference to the Global Positioning System (GPS) satellite navigation system, and a wireless communications system and associated mobile terminal employing Time Division Multiple Access (TDMA) multiplexing. However, the present invention is not so limited, and may be applied to a broad array of satellite navigation systems and wireless communications systems to overcome mobile terminal transmitter interference with the satellite navigation signals.

Figure 1:
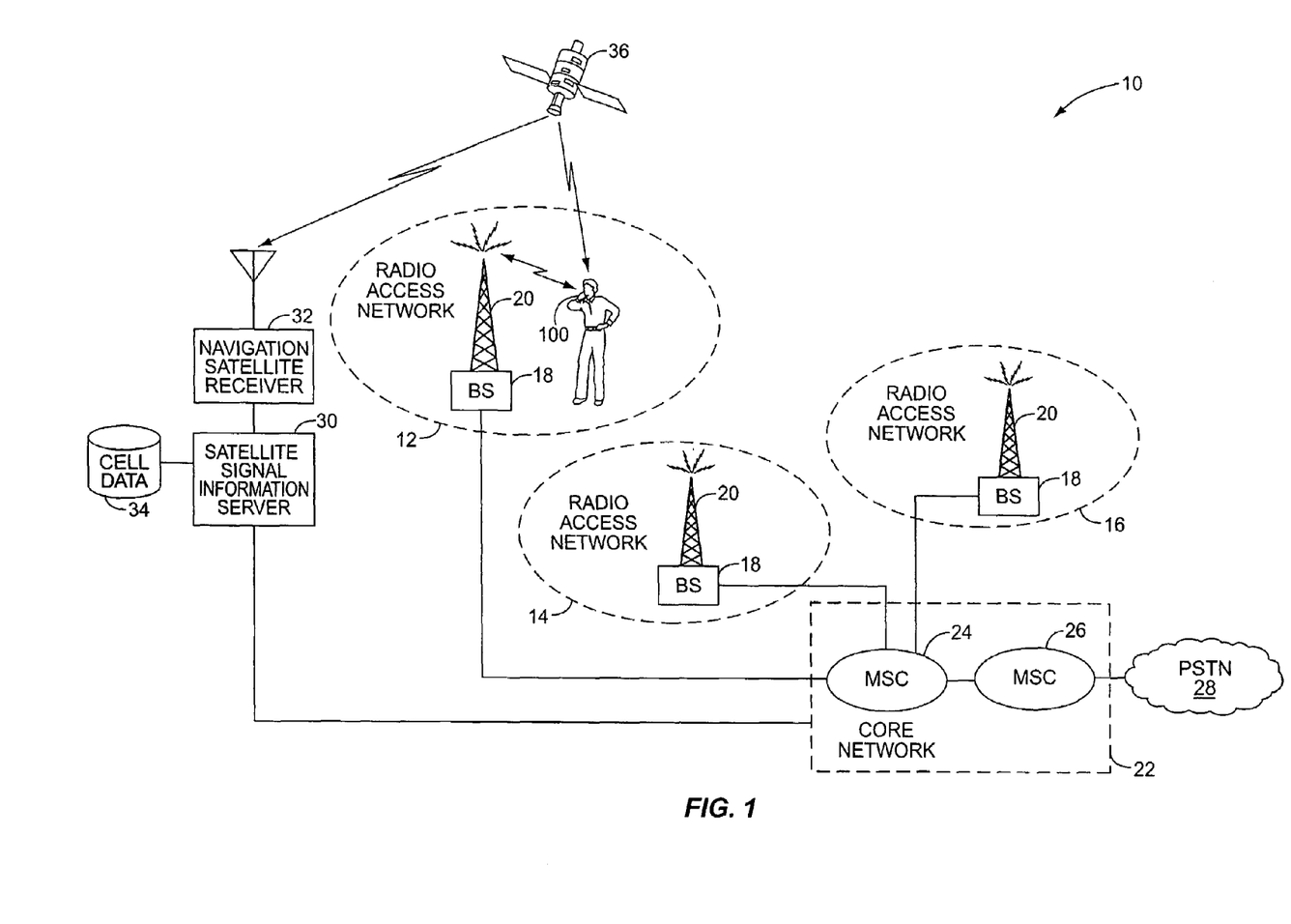
FIG. 1 depicts in functional block diagram view a mobile communications system including a satellite navigation signal information server, according to the present invention.

A representative wireless communications system providing position estimate assistance information according to the present invention is depicted in FIG. 1, and indicated generally by the numeral 10. Mobile communications system 10 comprises a plurality of radio access networks 12, 14, and 16, core network 22, and GPS signal information server 30. The mobile communications system 10 provides wireless 2-way voice and data communications to a plurality of mobile terminals (MT) 100 with integrated GPS receivers or other positioning receivers.

Each Radio Access Network 12, 14, 16 comprises at least one base station 18 and associated radio frequency transceivers and antennas 20, to establish radio communications with MTs 100 within their geographic range or cell. The Core Network 22 comprises Mobile Switching Centers (MSC) 24, 26, and various information servers and databases (not shown). At least one MSC 24, 26 of the Core Network 22 is connected to the Public Switched Telephone Network (PSTN) 28. The MSC 24, 26 performs the call routing and network configuration functions necessary to effect communications between MTs 100 in contact with Radio Access Networks 12, 14, 16, and/or between MTs 100 and telephones and terminals in the PSTN 28.

As depicted in FIG. 1, a GPS satellite 36 broadcasts navigation signals to MTs 100 within the mobile communications system 10, and additionally to one or more fixed GPS receivers 32. GPS signal information server 30 acquires information about the signals broadcast by GPS satellites 36 from the GPS receiver 32. Additionally, GPS signal information server 30 may retrieve geographic and other information regarding Radio Access Networks 12, 14, 16 from cell database 34. The GPS signal information server 30 transfers information regarding signals broadcast by GPS satellites 36 through the Core Network 22 and Radio Access Network 12, 14, 16 to MTs 100.

Figure 2:
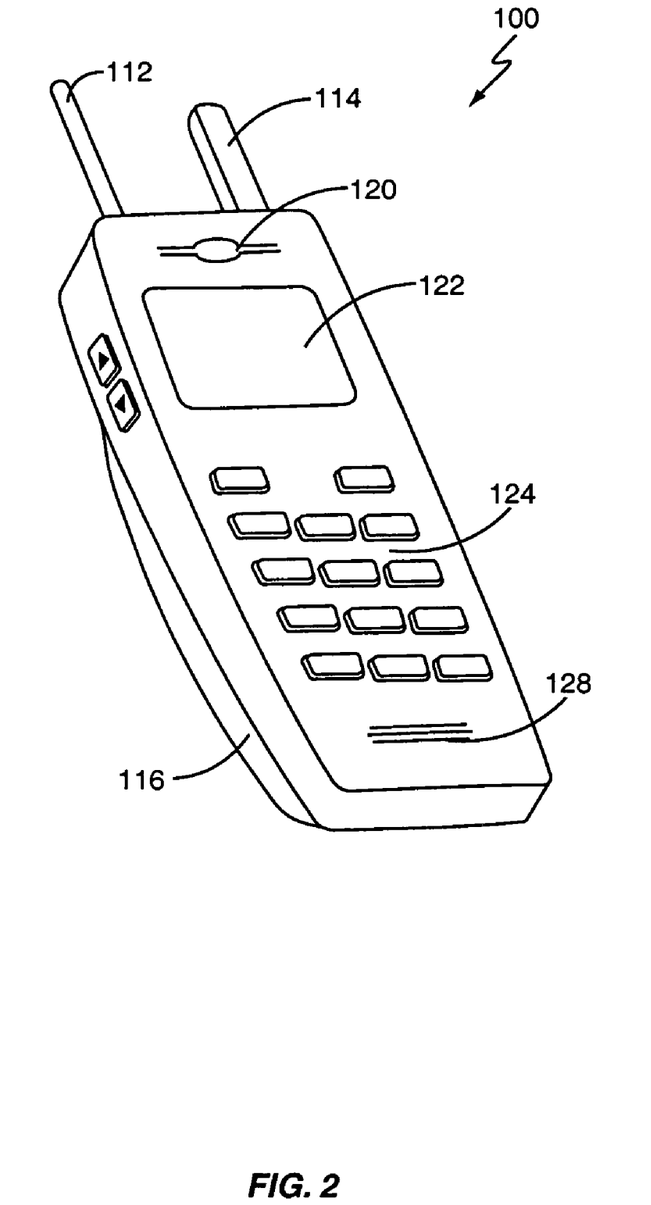
FIG. 2 is a perspective view of a wireless communications system mobile terminal integrated with a satellite navigation position estimator.

A representative MT 100 is depicted in FIG. 2. MT 100 is a fully functional wireless communications system mobile terminal that additionally includes a GPS receiver. MT 100 includes a mobile terminal antenna 112, a battery pack 116, a speaker 120, an alphanumeric display 122, dialing and control buttons 124, and a microphone 126. These elements are common to wireless communications mobile terminals, and may be arranged and configured in a broad variety of ways. MT 100 additionally includes a GPS antenna 114, for the reception of radio signals broadcast by GPS satellites 38.

The generally elevated position of both mobile communications system antennas 20 (generally disposed atop a tower) and of GPS satellites 36, together with the shielding effect of the user's head and arm when the MT 100 is deployed in a functional position, dictate that both mobile terminal antenna 112 and GPS antenna 114 be located at or near the top of the MT 100, as depicted in FIG. 2. This co-location of the two antennas precludes effective shielding of the electromagnetic transmissions from mobile terminal antenna 112 so as to prevent interference with the reception of GPS signals by GPS antenna 114. This electromagnetic interference path is depicted graphically as line 113 in FIG. 3.

Figure 3:
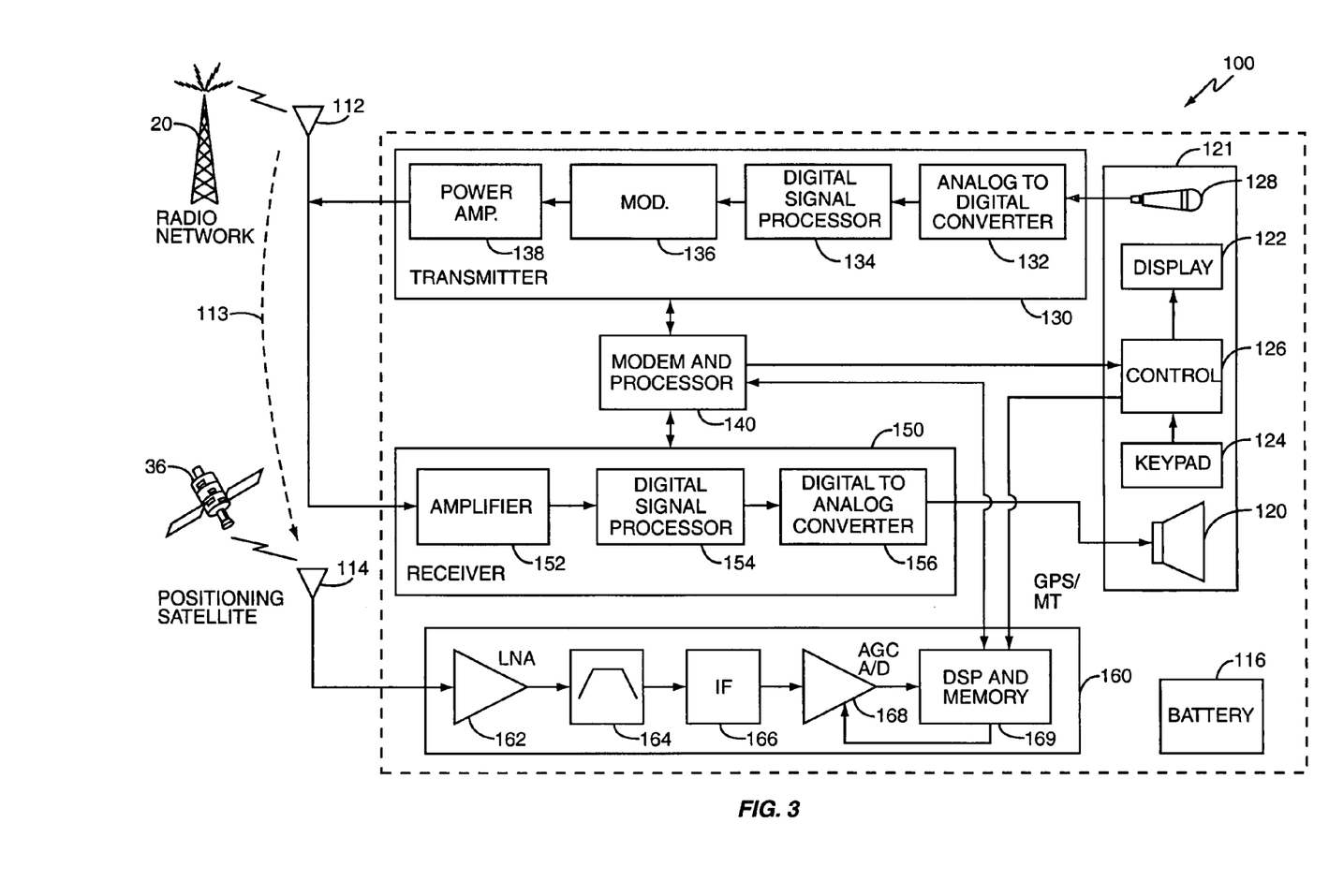
FIG. 3 is a functional block diagram of the mobile terminal and position estimator of FIG. 2.

FIG. 3 depicts, in block diagram form, the operative electronics of the MT 100. The battery 116 supplies electrical power to all electronics comprising the MT 100. These electronics, depicted in FIG. 3 as functional blocks, comprise user interface 121, transmitter 130, central control unit 140, receiver 150, and GPS unit 160. Connected to both the transmitter 130 and receiver 150 is the mobile terminal antenna 112, in radio communication with one or more base station antennas 20. GPS unit 160 is connected to GPS antenna 114, which receives GPS signals broadcast from a plurality of GPS satellites 36. GPS antenna 114 also receives electromagnetic interference from mobile terminal 112, via path 113, during transmission of voice or data from MT 100 to mobile communications system antenna 20.

The user interface 121 comprises a speaker 120, display 122, keypad 124, user interface control unit 126, and microphone 128. The display 122 allows the user to see dialed digits and call status information, displays menus by which the user selects modes and features, and allows the user to view information output by various programs. Keypad 124 permits the operator to dial numbers, enter commands, and select options. Display 122 and keypad 124 collectively provide a means for the user to control the operation of the MT 100.

The user interface 121 further includes an audio interface comprising a microphone 128 and speaker 120. The microphone 128 receives audio input from the user and converts it to audio signals that are passed to the transmitter 130. The speaker 120 converts analog signals from the receiver 150 to audio signals that can be heard by the user. User interface control unit 126 interfaces the display 122, and keypad 124 with the central control unit 140, and additionally with the GPS unit 160.

The transmitter 130 receives analog audio signals from the microphone 128, and under the control of the central control unit 140, converts the audio signals to a radio frequency signal suitable for transmission via the mobile antenna 112 to one or more antennas 20 of the communication system 10. The transmitter 130 includes an analog to digital converter 132, a digital signal processor 134, a modulator 136, and an amplifier 138. The analog to digital converter 132 changes the analog signal from the microphone 128 into a digital signal. The digital signal is passed to the digital signal processor (DSP) 134. The DSP 134 compresses the digital signal and inserts error detection, error correction and signaling information. The DSP 134 may also assemble the digital data into time division multiplexed (TDM) frames, as specified by various wireless communications standards and protocols. The compressed and encoded signal from the DSP 134 is passed to the modulator 136. The modulator 136 converts the digital signal to a form that is suitable for transmission on a radio frequency (RF) carrier. The amplifier 138 then boosts the output of the modulator 136 for transmission via mobile terminal antenna 112.

The receiver 150 receives radio signals from the mobile terminal antenna 112, and converts them to audio signals that are sent to the user via speaker 120. Receiver 150 includes an analog receive chain 152, a digital signal processor 154, and a digital to analog converter 156. Received signals are passed to the analog receive chain 152. The analog receive chain 152 includes various amplifiers, filters and mixers that boost the low-level RF digital signal to a level appropriate for input to the DSP 154. The DSP 154 includes a demodulator and channel decoder. The demodulator extracts the transmitted bit sequence from the received signal. The channel decoder detects and corrects channel errors in the received signal. The channel decoder also separates control and signaling data from speech data. The DSP 144 may also include an equalizer to compensate for phase and amplitude distortion of the transmitted signal. The control and signaling data is passed to the central control unit 140. The digital to analog converter 156 converts the speech data into an analog signal that is applied to the speaker 120 to generate audible signals that can be heard by the user. Both the transmitter 130 and the receiver 150 are coupled to the mobile terminal antenna 112. The antenna 112 is used for both transmission and reception of RF signals.

The central control unit 140, such as a programmed microprocessor, coordinates the operation of the transmitter 130 and receiver 150, and may additionally control or interface to the GPS unit 160. The mobile terminal control functions of the central control unit 140 include power control, channel selection, timing and framing, as well as a host of other functions. The central control unit 140 inserts signaling messages into the transmitted signals and extracts signaling messages from the received signals. These signaling messages may include GPS signal information that is transferred to the GPS unit 160. The central control unit 140 responds to any base station commands contained in the signaling messages, and implements those commands. When the user enters commands via the keypad 124, the commands are transferred to the central control unit 140 for action.

The GPS unit 160 receives signals from GPS satellites 36 via GPS antenna 114, and calculates geographic position estimates based on these signals. The GPS unit 160 includes a low noise amplifier 162, band pass filter 164, intermediate frequency (IF) section 166, automatic gain control and analog to digital converter unit 168, and digital signal processor and associated memory 169. The low noise amplifier 162 amplifies the very weak GPS signals received by the GPS antenna 114 in order to reduce the signal degradation due to receiver noise (i.e., to maintain a low receiver noise figure). The band pass filter 164 attenuates signals from the low noise amplifier 162 outside of the specific frequency range of interest. The intermediate frequency section 166 demodulates the amplified and band pass filtered signal by a combination with an intermediate frequency generated by a local oscillator. The demodulated signal is passed to the AGC and A/D unit 168 that dynamically amplifies the demodulated signal as needed, and converts the signal to a digital format. The digital GPS satellite signal is then passed to the digital signal processor which performs the various signal processing functions required to generate position estimates from the signals broadcast by GPS satellites 36. The GPS DSP 169, according to the present invention, may additionally receive GPS satellite signal information from the central control unit 140, said information having been received via receiver 150 from the wireless communications system 10. Additionally, the GPS DSP 169 may send requests or other commands to the central control unit 140 that are in turn forwarded via the transmitter 130 to the wireless communications system 10. In this manner, the wireless communications system 10 may assist the GPS unit 160 in performing its position estimates, particularly in the face of RF interference from transmitter 130.

The effects of RF interference from transmitter 130 on the GPS satellite signal received and processed by GPS unit 160 may be understood in greater detail by consideration of the signal processing steps performed by the GPS unit 160 in computing a geographic position estimate. The signal processing may be functionally considered as a 3-step process, comprising acquisition; synchronization and demodulation; and measurement and position computation.

During the acquisition phase, the GPS unit 160 searches for all visible GPS satellites 36 by correlating the received GPS signal with locally generated replicas of the pseudonoise (PN) codes of the respective GPS satellites 36. To increase acquisition sensitivity, the GPS unit 160 may correlate, or dwell, for each code phase search over multiple 1-millisecond periods of the GPS PN code.

In the synchronization and demodulation phase, once the GPS unit 160 has acquired a satellite code, it will synchronize its local clock to the satellite clock. This typically comprises synchronizing to the 20-millisecond bit edges of the transmitted satellite navigation signal, followed by frame synchronization using a known pattern in the GPS signal. Once synchronized, the receiver demodulates the GPS signal from each acquired satellite, thereby obtaining a time reference and precise orbital and clock models, collectively known as ephemeris, for each respective GPS satellite 36.

In the measurement and position computation phase, the GPS unit 160, using the information collected during acquisition and synchronization/demodulation for four or more GPS satellites 36, computes the respective satellite-to-MT range estimates. These range estimates, that include receiver clock uncertainty, are referred to as pseudoranges. Using the pseudoranges and the associated position estimates of the satellites 36 computed from the ephemeris, the GPS unit 160 calculates its own geographic position and clock offset.

Interference from radio signals transmitted on the mobile terminal antenna 112 are problematic for the GPS unit 160 during both acquisition and synchronization/demodulation phases. During acquisition, if the dwell time is less than the duration of the interference, the interference may obscure the received GPS signal during the dwell in which the GPS unit 160 is using the correct code phase hypothesis, thus precluding acquisition of the relevant signal. This problem may be solved, however, e.g. by a tiered search strategy in which the GPS unit 160 utilizes progressively longer dwells in order to increase acquisition sensitivity.

A more severe effect of the interference is manifest in the synchronization and demodulation step. In particular, the interference may preclude bit-edge synchronization. Bit-edge synchronization and the effects of periodic signal interference are explained herein with reference to FIG. 4. To accurately measure the range of a GPS satellite 36, the GPS unit 160 must measure the offset between its local clock and the clock aboard the satellite 36 with a high degree of precision. This offset must be calculated separately for each GPS satellite 36 used in a position estimate (i.e., at least 4). In an exemplary embodiment, the local clock offset determination is a two-step operation. First, the GPS unit 160 synchronizes to the 20-millisecond bit edges of the transmitted signal. Second, the GPs unit 160 searches the synchronized signal against a known pattern, to achieve frame synchronization. Interference from the transmitter 130 can preclude the initial step of bit-edge synchronization.

Figure 4:
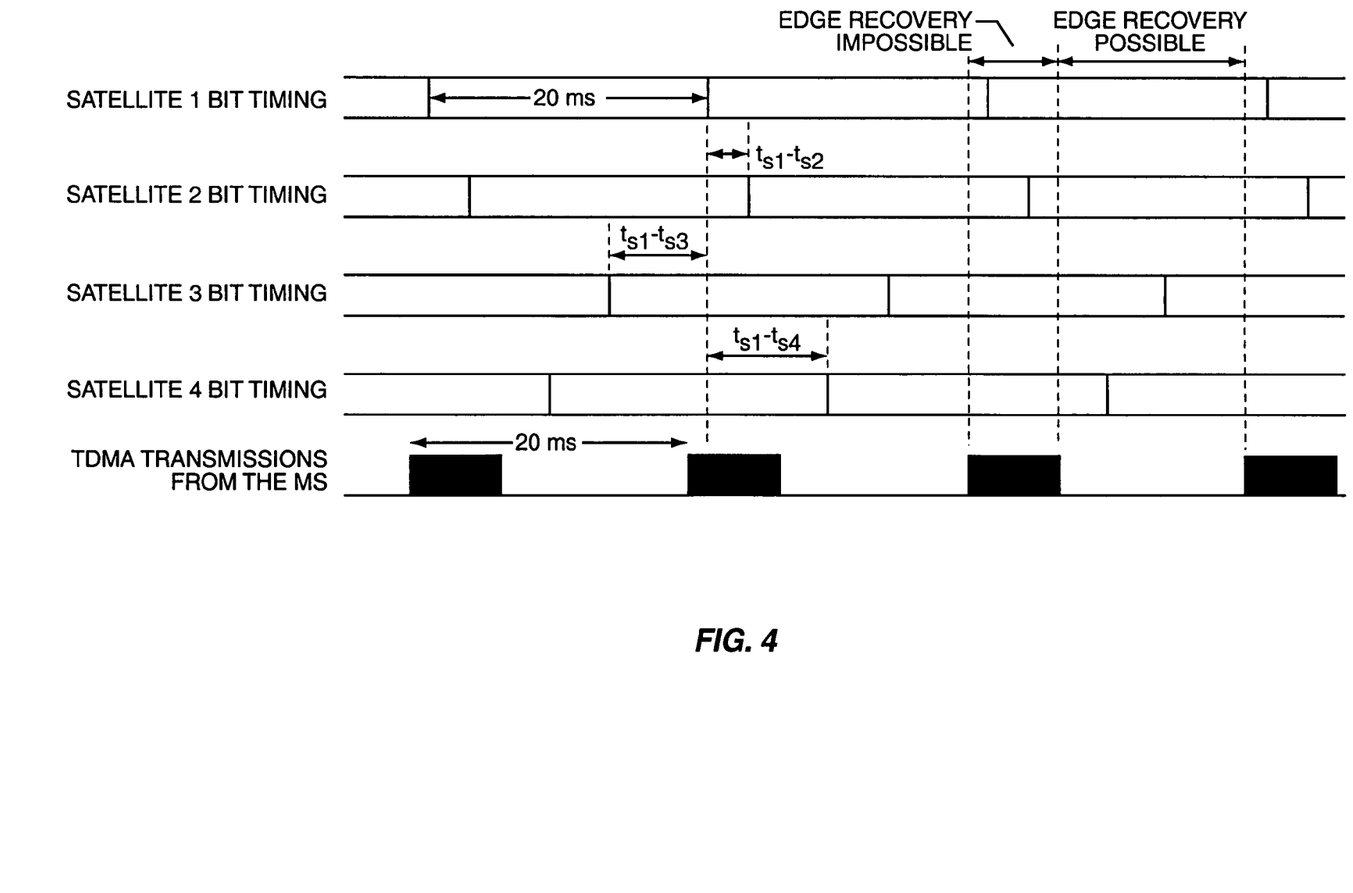
FIG. 4 is a representative timing diagram showing four satellite signals with relative bit-edge timing values and periodic burst interference.

FIG. 4 depicts four satellite signals received by the GPS unit 160, along with periodic interference due to TDMA transmissions from the transmitter 130. The satellite signal bit-edges, to which the GPS unit 160 must synchronize, occur at 20-millisecond intervals, with random offsets relative to each other and to the periodic interference. If the period of interference (or integer multiples thereof) is equal to the 20-millisecond GPS data bit period, one or more of the satellites' bit-edges may fall within the interference duration, making bit-edge synchronization impossible.

The interference pattern depicted in FIG. 4 represents a 20-millisecond transmit period with a one-third duty cycle, as specified in the ANSI-136 TDMA air interface standard.

The bit-edges for satellites one and two fall within the 6.67-millisecond transmit burst, while those for satellites three and four fall within the 13.33-millisecond period when the transmitter is idle. FIG. 4 also depicts the Time Difference of Arrival (TDOA) information between satellites one and two, satellites one and three, and satellites one and four. In general, TDOA values refer to the relative timing information between two satellite signals, i.e., the delay or offset of one signal relative to another. The GPS unit 160, however, does not initially have access to the TDOA data, and thus must perform bit-edge synchronization separately for each satellite signal. For the situation depicted in FIG. 4, this bit-edge synchronization is impossible for satellites one and two due to interference. This will lead to extremely large errors in computed position.

Figure 5A:
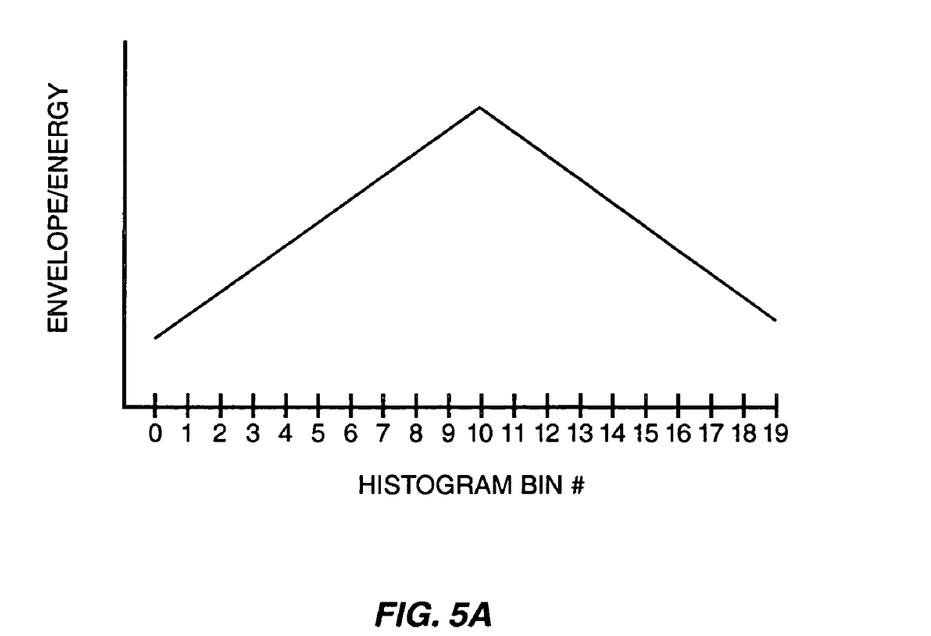
FIG. 5A is a graph of a histogram depicting successful bit-edge synchronization with a satellite signal.

One method of bit-edge synchronization used by the GPS unit 160 is described with reference to FIGS. 5A and 5B. GPS receivers typically employ a millisecond counter to track the current state of a GPS signal bit. That is, a counter that increments every millisecond and counts modulo 20. Prior to bit-edge synchronization, the counter is initialized with a random value. The bit-edge synchronization process then adjusts the value of this counter such that the zero point corresponds to the GPS data bit transition.

One exemplary bit-edge synchronization algorithm is based on a 20-bin histogram, where each bin is associated with a particular value of the counter. Initially, all histogram bins are set to zero. The initial value of the counter is then adjusted, and the energy or envelope values of the GPS signal over a series of sliding 20-millisecond windows are calculated, with the histogram being updated at the completion of each 20-millisecond window. During each window, the envelope or energy detected in the GPS satellite signal is summed according to the following equations:

$$I_{20\,ms} = \sum_{K=n-19}^{n} I_{1\,ms}(k)$$

$$Q_{20\,ms} = \sum_{K=n-19}^{n} Q_{1\,ms}(k)$$

metric=$\sqrt{(I_{20ms})^2+(Q_{20ms})^2}$ or $(I_{20ms})^2+(Q_{20ms})^2$ histogram(ms_count)=histogram(ms_count)+metric where ms_count represents the current state of the millisecond counter of the GPS receiver 160;
n represent the number of milliseconds elapsed since the GPS receiver 160 powered up;
$I_{1ms}(k)$ and $Q_{1ms}(k)$ represent the 1-millisecond duration in-phase and quad-phase correlation results for millisecond k; and
metric is the envelope or energy metric employed.

The iterative process of sliding the 20-millisecond window relative to the GPS satellite signal bit stream and updating the histogram values continues until the algorithm determines that a sufficient number of data points have been collected. At this point, the histogram is searched for the maximum value, which indicates the presence of a bit-edge, i.e., the sliding 20-millisecond window beginning with a value that aligns with the GPS data bit transition. In the example depicted in FIG. 5A, the 20-millisecond counter window that begins at the value 10 is the one that aligns with the GPS data bit.

Figure 5B:
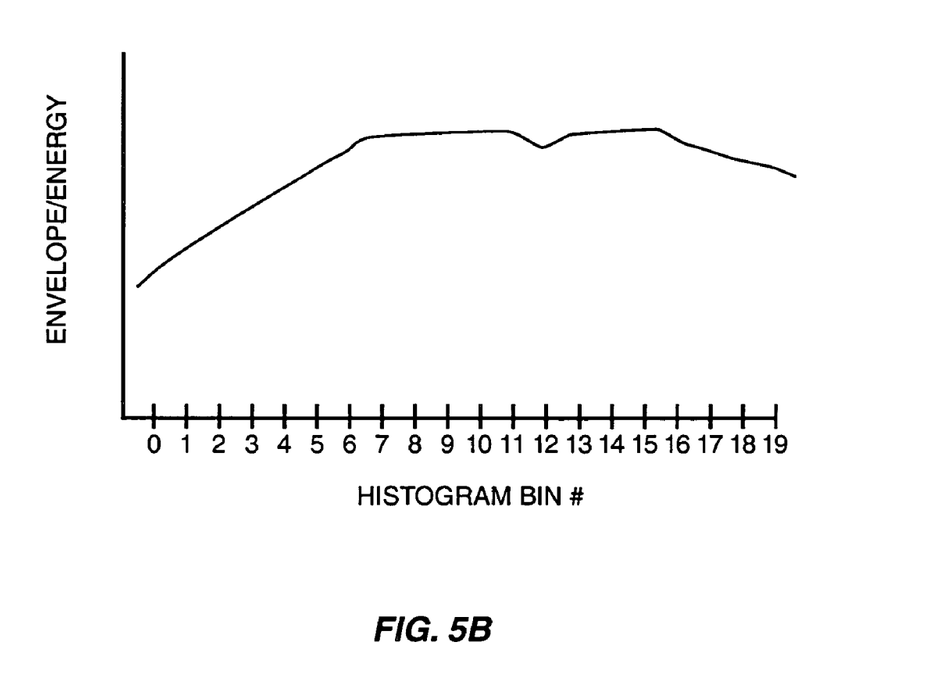
FIG. 5B is a graph of a histogram depicting bit-edge synchronization with a satellite signal being precluded by burst mode interference.

The histogram depicted in FIG. 5B results from performing the proceeding algorithm on a signal whose bit-edge is obscured by a burst transmission from the mobile terminal transmitter 130, e.g., satellites one or two in FIG. 4. Due to the burst mode interference, there is no clear maximum in the histogram that indicates the GPS signal bit-edge. Rather, the location of the bit-edge is reduced to an educated guess.

To completely determine the bit-edges in the presence of burst mode interference, the GPS unit 160 requires two types of information. First, it must detect when burst mode interference is obscuring the relevant GPS satellite signal bit edge. Second, the GPS unit 160 must have sufficient Time Difference Of Arrival (TDOA) values and at least one GPS satellite signal whose bit-edge transitions do not coincide with the burst interference. The first of these requirements, detection of burst mode interference obscuring the GPS satellite signal bit-edges, may be derived from the histogram results, or alternatively may be signaled to the GPS unit 160 by the mobile terminal, e.g., by the central control unit 140. The histogram of a satellite signal whose bit-edge is not obscured by burst mode interference will resemble that depicted by FIG. 5A. Conversely, the histogram of a satellite signal whose bit-edge transition is obscured by burst mode interference will resemble that of FIG. 5B. The two cases can be distinguished quantitatively by any of the following equations:

$$\text{metric} = \frac{\max(\text{histogram})}{E(\text{histogram})}$$

$$\text{metric} = \frac{\max(\text{histogram}) - \min(\text{histogram})}{\max(\text{histogram})}$$

$$\text{metric} = \frac{\text{var}(\text{histogram})}{E(\text{histogram})}$$

where max(histogram) refers to the maximum value of the histogram;
min(histogram) refers to the minimum value of the histogram;
E(histogram) refers to the mean value of the histogram; and
var(histogram) refers to the variance of the histogram;

Once burst mode interference with the bit-edge synchronization process is detected, there are three cases to consider. First, the TDOA values may necessarily indicate one or more satellites with a bit-edge transition that is not obscured by the burst mode interference. This result is assured if the TDOA value between two satellites is greater than the known duration of the burst mode interference, but less than the duration of non-burst interference. For the example of signals, interference, and TDOA values as depicted in FIG. 4, this results in the criterion 6.67<TDOA<13.33

One of the two satellite signals associated with this TDOA value is guaranteed to avoid having its bit-edge obscured by the TDOA burst. One of the two satellites is initially chosen at random; if its bit-edge transition is obscured by the burst interference, then the other satellite is chosen. The bit-edge synchronization process then runs to completion for the satellite signal with a clear bit-edge transition, and the TDOA offset is used to determine the bit transition timing of the other satellite signal. Similarly, the bit-edge timing of all remaining GPS satellite signals may be calculated from the TDOA values.

The second case is that no TDOA values fall within the guaranteed clear range. In this case, all of the satellites are ranked according to distance from the ideal range:

$$\text{distance} = \min(|\text{TDOA} - 6.67|, |\text{TDOA} - 13.33|)$$

Starting with the satellite with the smallest TDOA distance, each satellite is acquired and bit-edge synchronization attempted, with the resulting histogram evaluated to detect interference. If interference is detected, the satellite signal is discarded and the bit-edge synchronization process proceeds with the next candidate signal. If, however, no interference is detected and a clean bit-edge transition is resolved, then TDOA values can be used to synchronize the rest of the satellite signals.

Figure 6:
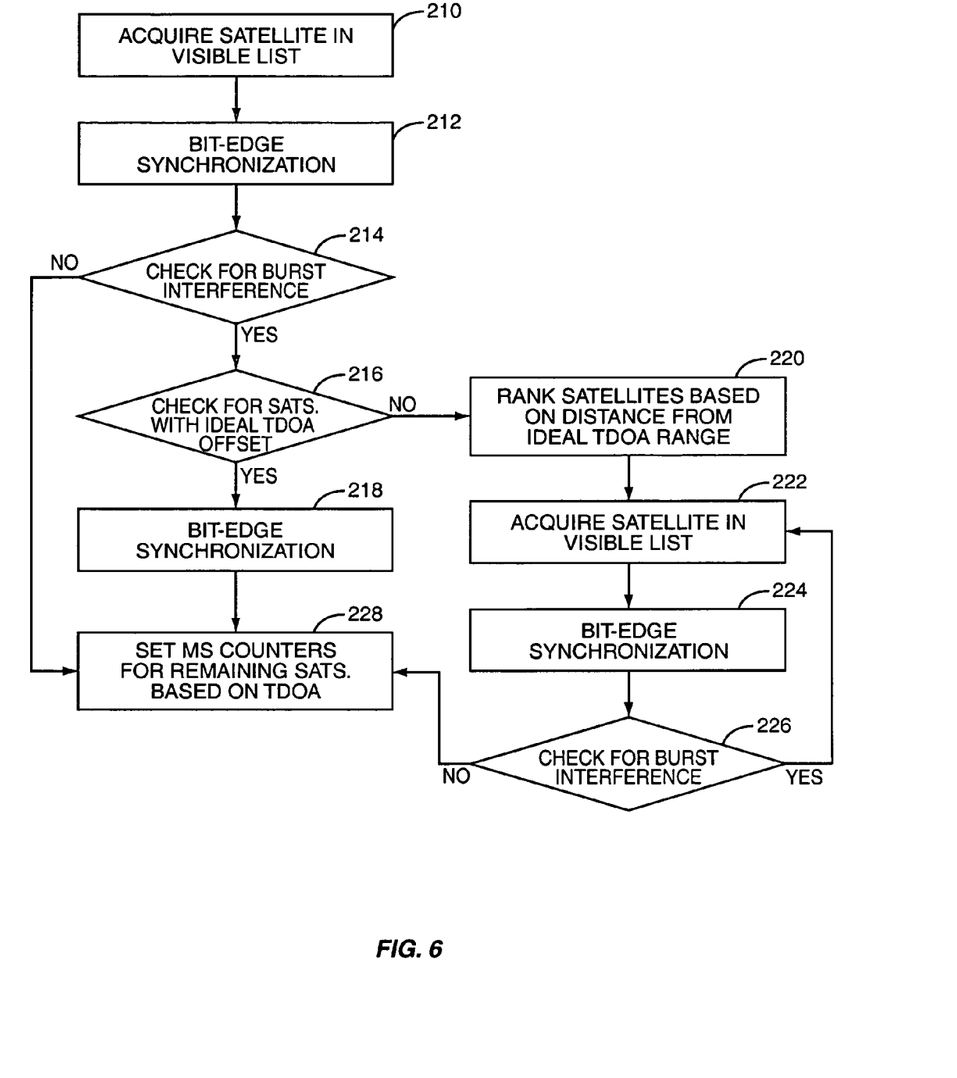
FIG. 6 is a flowchart showing the bit-edge synchronization algorithm of the present invention.

This process is depicted by the flowchart shown in FIG. 6. A first candidate satellite signal is acquired (step 210), and bit-edge synchronization is attempted (step 212). The resulting histogram is analyzed to detect burst mode interference (step 214). If no interference is detected, the remaining millisecond counters may be set (i.e., their bit-edge synchronizations calculated) from TDOA values (step 228). If interference with the first candidate satellite signal is detected (step 214), the TDOA values are analyzed to find a pair with an ideal offset, i.e., one that guarantees one of the signals to be free from interference (step 216). If such a TDOA value is found, its associated satellite signals are acquired and bit-edge synchronization attempted on one or both of them until one of them is bit-edge synchronized (step 218). The remaining satellite signals may then be synchronized from the remaining TDOA values (step 228). If no TDOA values fall within the ideal range (step 216), the satellite signals are ranked based on their distance from the ideal TDOA range (step 220). This ranked list is then iterated, acquiring successive signals (step 222) and attempting bit-edge synchronization (step 224), then checking for burst mode interference (step 226). If interference is found, the next candidate satellite on the ranked list is acquired (step 222), and synchronization attempted (step 224) and checked (step 226). This process continues through the list until successful bit-edge synchronization is performed, with no burst mode interference detected (steps 224, 226), and the remaining satellites' signal bit-edge synchronization is calculated from TDOA values (step 228).

Finally, if bit-edge synchronization is attempted on all received GPS satellite signals and interference is detected in each case, i.e., all bit-edge transitions occur during the burst interference, then accurate position estimates are not possible. This information may be transmitted via the central control unit 140 and transmitter 130 to the wireless mobile communication system 10. The relevant MSC 24, 26 may then take appropriate action, such as for example, assigning the MT 100 to a different TDMA time slot.

According to one aspect of the present invention, the mobile communications system 10 assists the MT 100 in performing position estimates in the face of periodic burst transmissions by supplying the MT 100 with GPS satellite signal information, via the data communication path of the wireless communications systems 10. Referring again to FIG. 1, a GPS receiver 32, in the same general geographic region as the MT 100, receives signals broadcast by GPS satellites 36. A variety of information regarding the GPS satellite signals is transferred from the GPS receiver 32 to a GPS signal information server 30. The GPS signal information server 30 may additionally retrieve information regarding specific cells from a cell database 34. The GPS signal information server 30 then transfers information regarding signals broadcast by GPS satellites 36 to requesting MTs 100 via the relevant MSC 24 in the wireless communication system 10. The GPS signal information supplied by server 30 may include TDOA values, satellite ephemeris data, clock corrections, corrections for ionospheric propagation delay, course long-term satellite orbits, and the like.

The server 30 may additionally provide the MT 100 with a list of satellites that are visible to the GPS receiver, or other such information regarding GPS satellites 36 and/or the signals broadcast by the satellites 36, as necessary and appropriate. The server 30 may transmit GPS satellite signal information to a specific MT 100, in response to a request for assistance from the MT 100. Alternatively or additionally, the GPS satellite signal information server 30 may periodically broadcast satellite signal information to all MTs 100 in a given cell. As another alternative, the GPS satellite signal information server 30 may broadcast GPS satellite signal information to all MTs 100 within a geographic region, regardless of the cell within which the MT 100 is operating.

In another embodiment of the present invention, the MT 100 does not receive assistance data (e.g., TDOA values) from the mobile communications system 10. Rather, the MT 100 may retrieve similar stored data that was captured during a recent position estimate. This stored data may have been received from the wireless communications system 10 previously, or may have been captured directly from the GPS satellites 36. Alternatively, the GPS satellite signal information may be obtained by the MT 100 via other communications means, for example, via a short-range, ad hoc wireless network such as the BLUETOOTH® network specification promulgated by Telefonaktiebolaget LM Ericsson, Sweden.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention. The present embodiments are therefore to be construed in all aspects as illustrative and not restrictive and all changes coming within the meaning and equivalency range of the appended claims are intended to be embraced therein.

What is claimed is:

1. A method of performing bit-edge synchronization for a plurality of navigation satellite signals in the presence of periodic interference comprising:
   obtaining predetermined TDOA values for said plurality of navigation satellite signals;
   performing bit-edge synchronization on one said satellite signal the bit edges of which are not obscured by said periodic interference; and
   calculating the bit-edge synchronization for at least one remaining satellite signal the bit edges of which are obscured by said periodic interference based on said predetermined TDOA values.

2. The method of claim 1, wherein performing bit-edge synchronization on one said satellite signal comprises;
   identifying at least one TDOA value between the duration of said periodic interference and the period of said periodic interference less said duration, said TDOA value associated with a first and second satellite signal;
   performing bit-edge synchronization on said first satellite signal; and
   if bit-edge synchronization on said first satellite signal fails due to said periodic interference, performing bit-edge synchronization on said second satellite signal.

3. The method of claim 1, wherein performing bit-edge synchronization on one said satellite signal comprises;
ranking said TDOA values into a list;
iteratively performing bit-edge synchronization on each said satellite signal according to said TDOA list until bit-edge synchronization on one said satellite signal is successful.

4. The method of claim 3, wherein ranking said TDOA values into a list comprises ranking said TDOA values by increasing distance.

5. The method of claim 4, wherein said distance is defined as the minimum of:
the absolute value of the difference between the TDOA value and the duration of said periodic interference and
the absolute value of the difference between the TDOA value and the period of said periodic interference less said duration.

6. The method of claim 1 wherein obtaining predetermined TDOA values for said plurality of navigation satellite signals comprises receiving information necessary to determine said TDOA values via an associated wireless communications mobile terminal.

7. The method of claim 6 wherein said information necessary to determine said TDOA values comprises said TDOA values.

8. The method of claim 6 wherein said information necessary to determine said TDOA values is broadcast by a wireless communications system to all mobile terminals in a cell.

9. The method of claim 6 wherein said information necessary to determine said TDOA values is transmitted to said associated mobile terminal by a wireless communications system on a communications traffic channel.

10. The method of claim 1 wherein obtaining predetermined TDOA values for said plurality of navigation satellite signals comprises retrieving said TDOA values from an associated memory.

11. A method of performing bit-edge synchronization for at least a first and second navigation satellite signal in the presence of periodic interference comprising:
receiving said first navigation satellite signal the bit edges of which are not obscured by said periodic interference and performing bit-edge synchronization with said first signal;
receiving said second navigation satellite signal the bit edges of which are obscured by said periodic interference; and
calculating the bit-edge synchronization for said second signal based on predetermined TDOA values.

12. The method of claim 11, wherein said first and second navigation satellite signals are selected from among a plurality of navigation satellite signals by identifying a TDOA value between the duration of said periodic interference and the period of said periodic interference less said duration, said TDOA value associated with said first and second satellite signals.

13. The method of claim 11, wherein receiving said first navigation satellite signal and performing bit-edge synchronization with said first signal comprises:
ranking a plurality of TDOA values into a list; and
iteratively performing bit-edge synchronization on each satellite signal associated with each successive TDOA value in said list, until bit-edge synchronization is successful on one said satellite signal.

14. The method of claim 13, wherein ranking said TDOA values into a list comprises ranking said TDOA values by increasing distance.

15. The method of claim 14, wherein said distance is defined as the minimum of:
the absolute value of the difference between the TDOA value and the duration of said periodic interference and
the absolute value of the difference between the TDOA value and the period of said periodic interference less said duration.

16. The method of claim 11 wherein obtaining predetermined TDOA values for said plurality of navigation satellite signals comprises receiving information necessary to determine said TDOA values via an associated wireless communications mobile terminal.

17. The method of claim 16 wherein said information necessary to determine said TDOA values comprises said TDOA values.

18. The method of claim 16 wherein said information necessary to determine said TDOA values is broadcast by a wireless communications system to all mobile terminals in a cell.

19. The method of claim 16 wherein said information necessary to determine said TDOA values is transmitted to said associated mobile terminal by a wireless communications system on a communications traffic channel.

20. The method of claim 11 wherein obtaining predetermined TDOA values for said plurality of navigation satellite signals comprises retrieving said TDOA values from an associated memory.

21. A wireless communications system containing a radio access network, comprising:
at least one mobile terminal containing a position estimator and periodically transmitting radio frequency signals; and
a satellite navigation signal information server operative to transmit relative timing information between satellite navigation signals to said mobile terminal via said radio access network, wherein said relative timing information may be used by said mobile terminal to overcome interference from said periodic transmission of radio frequency signals in order to perform bit-edge synchronization.

22. The system of claim 21, wherein said satellite navigation signal information server broadcasts said satellite navigation signal timing information to said mobile terminal via said radio access network.

23. The system of claim 21, wherein said satellite navigation signal information server transmits said satellite navigation signal timing information to said mobile terminal on a forward traffic channel via said radio access network.

24. The system of claim 21, wherein said satellite navigation signal timing information is selected from the group including TDOA values, satellite ephemeris data, clock corrections, corrections for ionospheric propagation delay, and course long-term satellite orbits.

25. A wireless communications system mobile terminal, comprising:
a transceiver for establishing two-way wireless communications, at least partially via periodic radio frequency transmissions;
a position estimator receiving satellite navigation signals, said signals at least partially obscured by said periodic radio frequency transmissions; and a controller operative to perform bit-edge synchronization on said satellite navigation signals in the presence of said periodic radio frequency transmissions by use of predetermined satellite navigation signal information.

26. The mobile terminal of claim 25, wherein said predetermined satellite navigation signal information relates to the relative timing of said satellite navigation signals.

27. The mobile terminal of claim 26, wherein said predetermined satellite navigation signal information comprises TDOA data.

28. The mobile terminal of claim 25, wherein said predetermined satellite navigation signal information is received via said transceiver.

29. The mobile terminal of claim 25, further comprising a memory, and wherein said predetermined satellite navigation signal information is retrieved from said memory.

* * * * *